US011076409B2

(12) United States Patent
Sridharan et al.

(10) Patent No.: US 11,076,409 B2
(45) Date of Patent: Jul. 27, 2021

(54) POWER ALLOCATION FOR SUBBAND PRECODING

(71) Applicant: QUALCOMM Incorporated, San Diego, CA (US)

(72) Inventors: Gokul Sridharan, San Diego, CA (US); Jay Kumar Sundararajan, San Diego, CA (US); Yi Huang, San Diego, CA (US); Wei Yang, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 16/523,103

(22) Filed: Jul. 26, 2019

(65) Prior Publication Data

US 2020/0037328 A1 Jan. 30, 2020

Related U.S. Application Data

(60) Provisional application No. 62/712,034, filed on Jul. 30, 2018.

(51) Int. Cl.
*H04W 72/04* (2009.01)
*H04B 7/06* (2006.01)
*H04B 7/0456* (2017.01)

(52) U.S. Cl.
CPC ...... *H04W 72/0473* (2013.01); *H04B 7/0456* (2013.01); *H04B 7/0617* (2013.01); *H04W 72/0413* (2013.01)

(58) Field of Classification Search
CPC .......... H04W 72/0473; H04W 72/0413; H04B 7/0456; H04B 7/0617
See application file for complete search history.

(56) References Cited

U.S. PATENT DOCUMENTS 8,838,051 B1 * 9/2014 Su .................. H04B 7/0465
455/127.2
2012/0115531 A1 5/2012 Gaal et al.
(Continued)

OTHER PUBLICATIONS

International Search Report and Written Opinion—PCT/US2019/043962—ISA/EPO—dated Oct. 2, 2019.

*Primary Examiner* — Chi H Pham
*Assistant Examiner* — Ji-Hae Yea
(74) *Attorney, Agent, or Firm* — QUALCOMM Incorporated

(57) ABSTRACT

Techniques are described herein for allocating transmit power between precoding resource groups (PRGs) and/or transmit chains of a user equipment (UE) to reduce the amount of total transmit power that is unused. The UE may determine a set of precoding scaling factors for each PRG to efficiently allocate a total transmit power between the PRGs using a two-stage approach. During a first stage, the UE may determine PRG-specific precoding scaling factors for each PRG associated with an uplink transmission. During a second stage, the UE may determine a residual precoding scaling factor to apply to all the PRGs associated with the uplink transmission and determine overall precoding scaling factors for each PRG. The second stage may be configured to refine the scaling factors determined in the first stage such that at least some of the unused transmit power is allocated to at least one of the PRGs or transmit chains.

30 Claims, 10 Drawing Sheets

(56) References Cited

U.S. PATENT DOCUMENTS

2017/0026988 A1* 1/2017 Guo .................... H04W 72/082
2018/0014255 A1* 1/2018 Pelletier .............. H04W 52/365

* cited by examiner

POWER ALLOCATION FOR SUBBAND PRECODING

CROSS REFERENCE

The present application for patent claims the benefit of U.S. Provisional Patent Application No. 62/712,034 by SRIDHARAN et al., entitled "POWER ALLOCATION FOR SUBBAND PRECODING," filed Jul. 30, 2018, assigned to the assignee hereof, and expressly incorporated herein by reference in its entirety.

BACKGROUND

The following relates generally to wireless communications, and more specifically to power allocation for subband precoding.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, UEs may use more than one transmit chain to transmit uplink transmissions. When using multiple transmit chains, the UE may allocate transmit power between the different transmit chains for the uplink transmission. Improved techniques for allocating transmit power are desired.

SUMMARY

The described techniques relate to improved methods, systems, devices, and apparatuses that support power allocation for subband precoding. Generally, the described techniques provide for allocating transmit power between precoding resource groups (PRGs) and/or transmit chains to reduce the amount of transmit power that is unused. In some wireless communications systems, power allocation between PRGs and/or transmit chains may be closely related to scaling (e.g., precoder scaling). For example, a device such as a user equipment (UE) may determine a set of scaling factors (e.g., precoding scaling factors) for each PRG such that the UE may efficiently allocate a total transmit power (e.g., between the transmit chains). The UE may, as one example, implement a two-stage approach to determining the precoder scaling factors. During a first stage, the UE may determine PRG-specific precoding scaling factors for each PRG associated with an uplink transmission. During a second stage, the UE may determine a residual precoding scaling factor to apply to all the PRGs associated with the uplink transmission and determine overall precoding scaling factors for each PRG. The second stage may be configured to refine the scaling factors determined in the first stage such that at least some of the unused transmit power is allocated to at least one of the PRGs and/or transmit chains.

A method of wireless communication is described. The method may include allocating a transmit power to each PRG associated with at least one of a set of transmit chains of a UE to be used to transmit an uplink transmission, determining a scaling factor for each PRG associated with allocating transmit power to PRGs based on allocating the transmit power to each PRG, determining a residual scaling factor allocating transmit power to PRGs to apply to all the PRGs based on the scaling factor for each PRG and allocating the transmit power to each PRG, and transmitting the uplink transmission based on the scaling factor for each PRG and the residual scaling factor for the PRGs.

An apparatus for wireless communication is described. The apparatus may include a processor, memory in electronic communication with the processor, and instructions stored in the memory. The instructions may be executable by the processor to cause the apparatus to allocate a transmit power to each PRG associated with at least one of a set of transmit chains of a UE to be used to transmit an uplink transmission, determine a scaling factor for each PRG associated with allocating transmit power to PRGs based on allocating the transmit power to each PRG, determine a residual scaling factor allocating transmit power to PRGs to apply to all the PRGs based on the scaling factor for each PRG and allocating the transmit power to each PRG, and transmit the uplink transmission based on the scaling factor for each PRG and the residual scaling factor for the PRGs.

Another apparatus for wireless communication is described. The apparatus may include means for allocating a transmit power to each PRG associated with at least one of a set of transmit chains of a UE to be used to transmit an uplink transmission, determining a scaling factor for each PRG associated with allocating transmit power to PRGs based on allocating the transmit power to each PRG, determining a residual scaling factor allocating transmit power to PRGs to apply to all the PRGs based on the scaling factor for each PRG and allocating the transmit power to each PRG, and transmitting the uplink transmission based on the scaling factor for each PRG and the residual scaling factor for the PRGs.

A non-transitory computer-readable medium storing code for wireless communication is described. The code may include instructions executable by a processor to allocate a transmit power to each PRG associated with at least one of a set of transmit chains of a UE to be used to transmit an uplink transmission, determine a scaling factor for each PRG associated with allocating transmit power to PRGs based on allocating the transmit power to each PRG, determine a residual scaling factor allocating transmit power to PRGs to apply to all the PRGs based on the scaling factor for each PRG and allocating the transmit power to each PRG, and transmit the uplink transmission based on the scaling factor for each PRG and the residual scaling factor for the PRGs.

Some examples of the method, apparatuses, and non-transitory computer-readable medium described herein may further include operations, features, means, or instructions for determining an overall scaling factor for each PRG of the uplink transmission by determining a product of each scaling factor and the residual scaling factor, where transmitting the uplink transmission may be based on the overall scaling factor.

Some examples of the method, apparatuses, and non-transitory computer-readable medium described herein may further include operations, features, means, or instructions for computing a power allocation information for each PRG based on the overall scaling factor for each PRG of the uplink transmission, where transmitting the uplink transmission may be based on the power allocation information.

Some examples of the method, apparatuses, and non-transitory computer-readable medium described herein may further include operations, features, means, or instructions for determining a difference between a total transmit power of the uplink transmission and a sum of transmit powers allocated to the set of PRGs of the uplink transmission, where determining the residual scaling factor may be based on the difference.

Some examples of the method, apparatuses, and non-transitory computer-readable medium described herein may further include operations, features, means, or instructions for determining an initial transmit power for each transmit chain of the transmit chains, where each transmit power allocated to the PRGs associated with the transmit chain may be upper bounded by the initial transmit power assigned to the transmit chain.

Some examples of the method, apparatuses, and non-transitory computer-readable medium described herein may further include operations, features, means, or instructions for determining an initial transmit power for each transmit chain of the transmit chains based on a number of PRGs associated with each transmit chain and an output power rating of each transmit chain. Some examples of the method, apparatuses, and non-transitory computer-readable medium described herein may further include operations, features, means, or instructions for determining an allocation of the initial transmit power to each PRG associated with the transmit chain, where the allocation to each PRG associated with the transmit chain may be upper bounded by the initial transmit power of the transmit chain. In some examples of the method, apparatuses, and non-transitory computer-readable medium described herein, the scaling factors determined for each PRG may be configured to maximize a transmit power used to transmit a respective PRG without exceeding the initial transmit power assigned to a respective transmit chain associated with the respective PRG.

Some examples of the method, apparatuses, and non-transitory computer-readable medium described herein may further include operations, features, means, or instructions for determining that a maximum transmit power of a transmit chain of the transmit chains may be less than a proposed transmit power for the transmit chain, where determining the initial transmit power for the transmit chain may include determining that the initial transmit power for the transmit chain is the maximum transmit power of the transmit chain based on determining that the maximum transmit power is less than the proposed transmit power of the transmit chain.

Some examples of the method, apparatuses, and non-transitory computer-readable medium described herein may further include operations, features, means, or instructions for identifying a first initial transmit power for the transmit chain by dividing a total transmit power of the uplink transmission between each transmit chain of the transmit chains.

In some examples of the method, apparatuses, and non-transitory computer-readable medium described herein, the first initial transmit power for the first transmit chain may be different than a second initial transmit power for a second transmit chain.

In some examples of the method, apparatuses, and non-transitory computer-readable medium described herein, determining the residual scaling factor further may include operations, features, means, or instructions for determining a common scaling factor to apply to all instances of the PRGs associated with the set of transmit chains.

Some examples of the method, apparatuses, and non-transitory computer-readable medium described herein may further include operations, features, means, or instructions for identifying a number of transmit chains to be used by the UE to transmit the uplink transmission, where allocating the transmit power to each PRG may be based on the number of transmit chains and precoders used for each PRG.

Some examples of the method, apparatuses, and non-transitory computer-readable medium described herein may further include operations, features, means, or instructions for identifying a number of PRGs associated with the transmit chain, where allocating the transmit power to each PRG may be based on the number of PRGs associated with the transmit chain.

Some examples of the method, apparatuses, and non-transitory computer-readable medium described herein may further include operations, features, means, or instructions for determining a combined transmit power of transmit chains associated with the uplink transmission based on transmit powers allocated to the transmit chains of the UE, where determining the residual scaling factor may be based on the combined transmit power.

Some examples of the method, apparatuses, and non-transitory computer-readable medium described herein may further include operations, features, means, or instructions for receiving, from a base station, a message indicating a total transmit power for the uplink transmission, where allocating the transmit power to each PRG may be based on receiving the message.

Some examples of the method, apparatuses, and non-transitory computer-readable medium described herein may further include operations, features, means, or instructions for identifying a set of subbands of a set of resources allocated to the UE by a base station and assigning a precoder to each subband of the subbands, where allocating the transmit power to each PRG may be based on assigning the precoder to each subband.

In some examples of the method, apparatuses, and non-transitory computer-readable medium described herein, the transmit chain may include a digital-to-analog converter, a power amplifier, and at least one antenna.

In some examples of the method, apparatuses, and non-transitory computer-readable medium described herein, the scaling factor may be a precoding scaling factor specific to each PRG associated with the uplink transmission, the residual scaling factor may be a common precoding scaling factor applied to all PRGs associated with the uplink transmission, and the precoding scaling factor specific to each PRG and the common precoding scaling factor may be configured to determine a power allocated to each PRG.

In some examples of the method, apparatuses, and non-transitory computer-readable medium described herein, a single PRG may be associated with multiple transmit chains of the UE. In some examples of the method, apparatuses, and non-transitory computer-readable medium described herein, the scaling factor may be a PRG-specific scaling factor that may be determined for each PRG.

Some examples of the method, apparatuses, and non-transitory computer-readable medium described herein may further include operations, features, means, or instructions for allocating a first transmit power to a first transmit chain and allocating a second transmit power different than the first transmit power to a second transmit chain based on the first transmit chain having a different power output rating than the second transmit chain, where the scaling factor for each PRG may be based on the second transmit power being different than the first transmit power.

DETAILED DESCRIPTION

Figure 1:
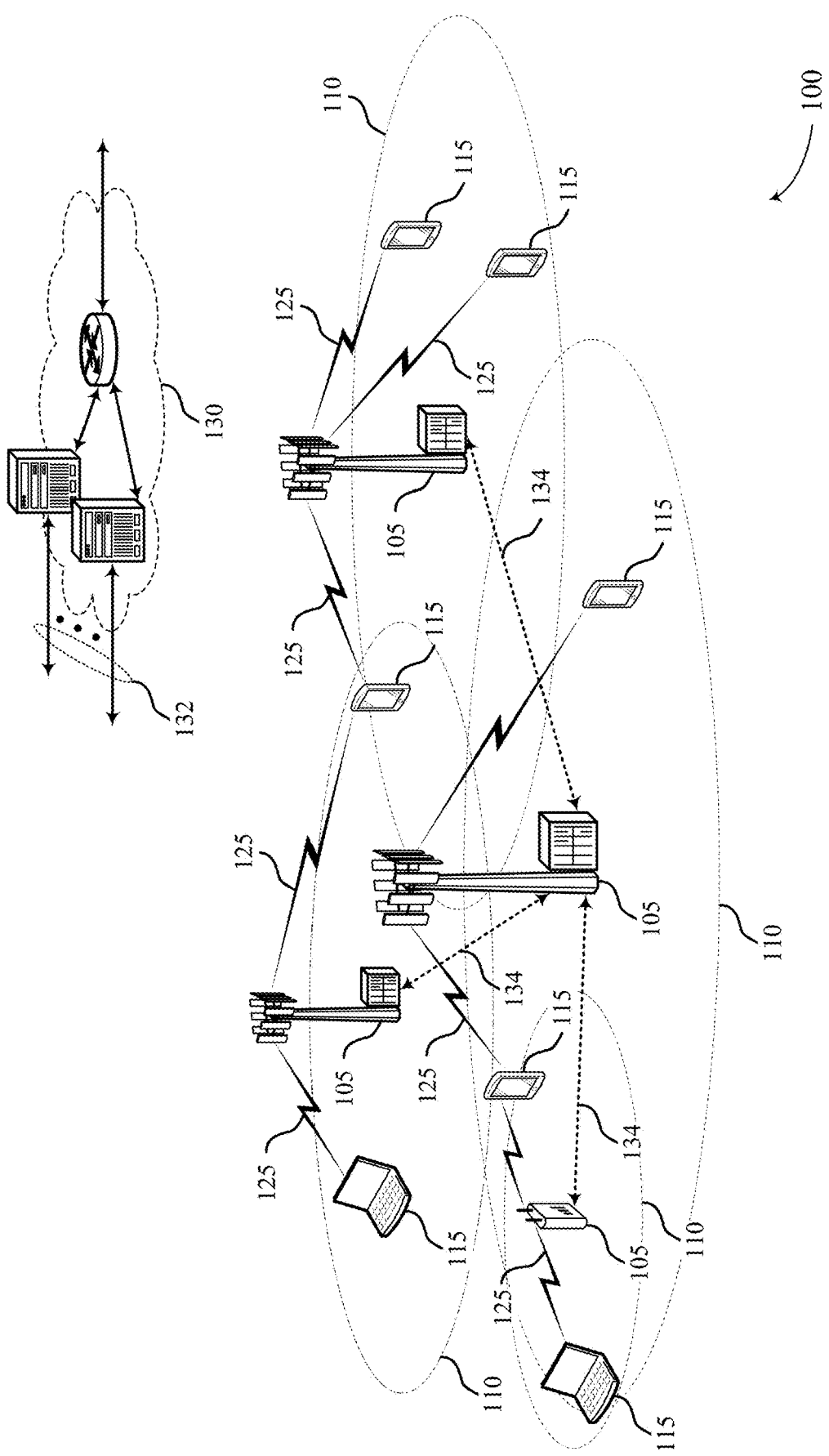
FIG. 1 illustrates an example of wireless communications system that supports power allocation for subband precoding in accordance with aspects of the present disclosure.

In some wireless communications systems, a device such as a user equipment (UE) may be configured to use more than one transmit chain to transmit uplink transmissions. When using multiple transmit chains, the total transmit power allocated by the base station to the UE may be divided between the different transmit chains. In some cases, the procedures for dividing the total transmit power between different transmit chains may result in some transmit power being unused, or the transmit power being used inefficiently.

For example, when precoding resource groups (PRGs) are asymmetrically distributed between transmit chains, some transmit power may be left unused or may be allocated without making the best use of the transmit power. In some cases, allocating this unused transmit power may present a max-min optimization problem with a mix of linear and quadratic constraints. Due to power constraints, computational resource constraints, time constraints, or a combination thereof, a UE may not be configured to solve such an optimization problem-especially in real time. The techniques described herein implement a heuristic approach to solve a power allocation problem.

Techniques are described herein for allocating transmit power between PRGs and/or transmit chains to reduce the amount of transmit power that is unused. In some wireless communications systems, power allocation between PRGs and/or transmit chains may be closely related to scaling, such as precoder scaling. The UE may determine a set of precoding scaling factors for each PRG such that the UE may efficiently allocate a total transmit power between the transmit chains. During a first stage of the procedures, the UE may determine PRG-specific precoding scaling factors for each PRG of an uplink transmission. During a second stage of the procedures, the UE may determine a residual precoding scaling factor to apply to all the PRGs of the uplink transmission and may determine overall precoding scaling factors for each PRG. The second stage may be configured to refine the scaling factors determined in the first stage such that at least some of the transmit power (e.g., unused transmit power) is allocated to at least one of the PRGs or transmit chains.

Particular aspects of the subject matter described herein may be implemented to realize one or more advantages. The described methods, systems, devices, and apparatuses provide techniques which may support power allocation for subband precoding, among other advantages. As such, supported techniques may include features for allocating transmit power between precoding resource groups (PRGs) and/or transmit chains to reduce the amount of transmit power that is unused. Additionally, the improved techniques provide for determining a set of scaling factors (e.g., precoding scaling factors) for each PRG such that the UE may efficiently allocate a total transmit power (e.g., between the transmit chains). The improved techniques may include features for using a ratio to allocate the total transmit power between transmit chains, thereby dividing the transmit power more equally across all the transmit chains compared to other techniques.

Aspects of the disclosure are initially described in the context of wireless communications systems. Aspects of the disclosure are described with reference to a diagram and a process flow. Aspects of the disclosure are further illustrated by and described with reference to apparatus diagrams, system diagrams, and flowcharts that relate to power allocation for subband precoding.

FIG. 1 illustrates an example of a wireless communications system 100 that supports power allocation for subband precoding in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interfaces). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink component carriers (CCs) and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The UEs 115 may be configured to allocate transmit power between PRGs and/or transmit chains to reduce an amount of total transmit power that is unused or misallocated. For example, a UE 115 may determine a set of precoding scaling factors for each PRG to efficiently allocate a total transmit power between the PRGs, for example, using a two-stage approach.

As part of an example two-stage approach, during a first stage, the UE 115 may determine PRG-specific precoding scaling factors for each PRG associated with an uplink transmission. During a second stage, the UE 115 may determine a residual precoding scaling factor to apply to at least some, if not all, of the PRGs associated with the uplink transmission and determine overall precoding scaling factors for each PRG. The UE 115 may apply the overall precoding scaling factors to the precoder matrices for at least some, if not each, PRG.

Figure 2:
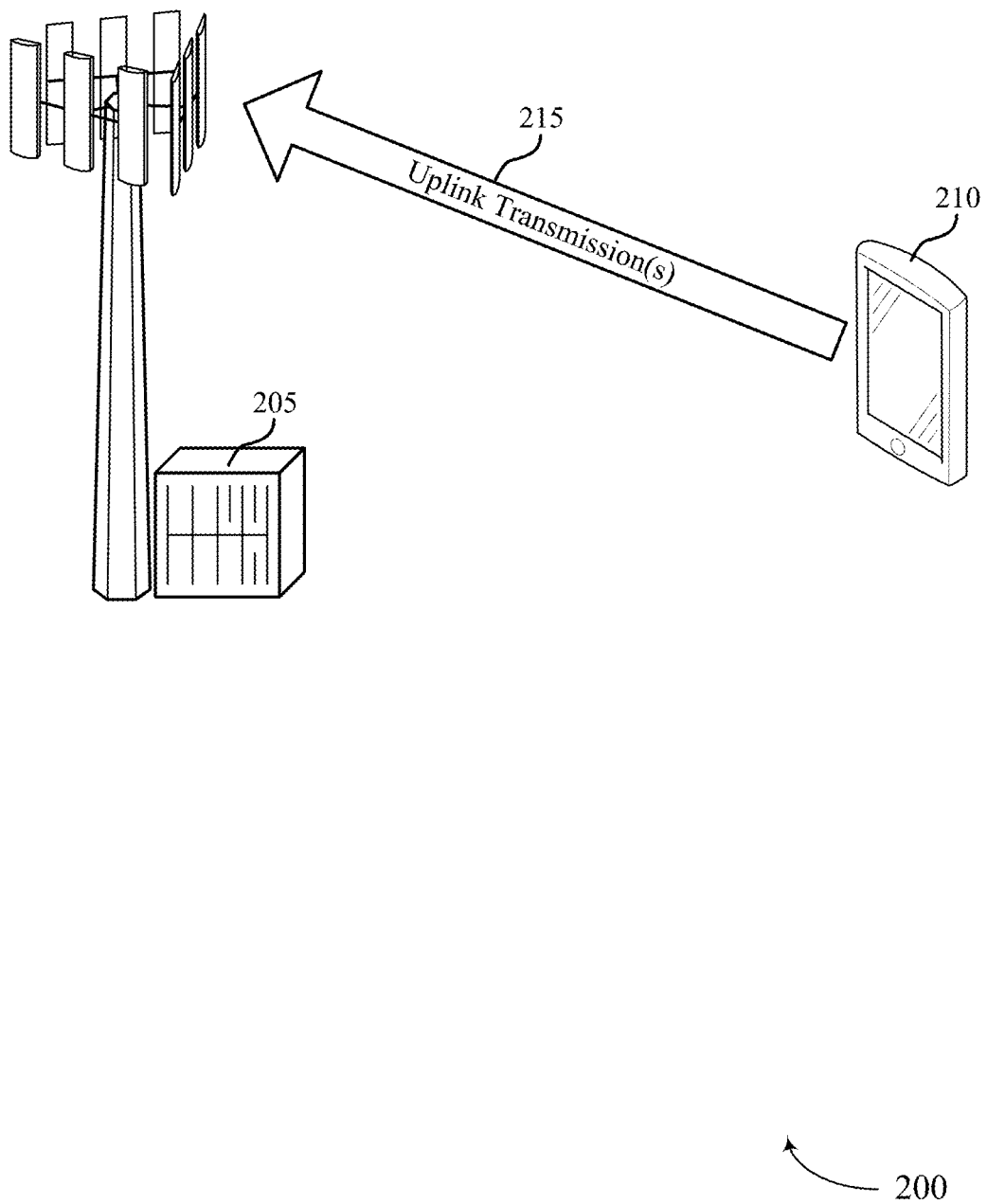
FIG. 2 illustrates an example of a wireless communications system that supports power allocation for subband precoding in accordance with aspects of the present disclosure.

FIG. 2 illustrates an example of a wireless communications system 200 that supports power allocation for subband precoding in accordance with aspects of the present disclosure. In some examples, the wireless communications system 200 may implement aspects of the wireless communications system 100. The wireless communications system 200 may include one or more base stations 205 and one or more UEs 210. The one or more base stations 205 may be examples of the base stations 105 described with reference to FIG. 1. The one or more UEs 210 may be examples of the UEs 115 described with reference to FIG. 1.

The base station 205, among other example devices, may schedule resources to be used by the UE 210 to transmit uplink transmissions 215. The base station 205 may inform the UE 210 about the allocated resources through a message. In some cases, the message may assign a single total transmit power (e.g., transmission power budget) to the UE 210 for a scheduled transmission. The total transmit power may be configured to be split across the set of resource blocks assigned by the base station 205 to the UE 210 for the uplink transmission 215.

The UE 210 may include a plurality of transmit chains that may be used to transmit uplink transmissions 215. A transmit chain may be a set of radio frequency (RF) components configured to transmit data. In some examples, a transmit chain may include a power amplifier, one or more antennas, one or more digital-to-analog converters, or other components, or a combination thereof. The UE 210 may use the plurality of transmit chains to communicate various signals, such as multiple-input and multiple-output (MIMO) signals. When the UE 210 includes a plurality of transmit chains, the total transmit power allocated by the base station 205 for the uplink transmission 215 may be split between the different transmit chains.

Some techniques may not outline with specificity how the total transmit power may be split between resource blocks allocated to the UE 210 for the uplink transmission 215, PRGs associated with the uplink transmission 215, or transmit chains of the UE 210, or a combination thereof. In addition, some techniques may not address how the total transmit power may be split between transmit chains of the UE 210 when at least some of the transmit chains have different power ratings (e.g., the power amplifiers of the transmit chains have different power ratings). Techniques are described herein for allocating transmit power for the uplink transmission 215 to the transmit chains of the UE 210 and/or the resource blocks associated with the uplink transmission 215 given the total transmit power allocated to the UE 210 and/or the precoders of the UE 210.

Figure 3:
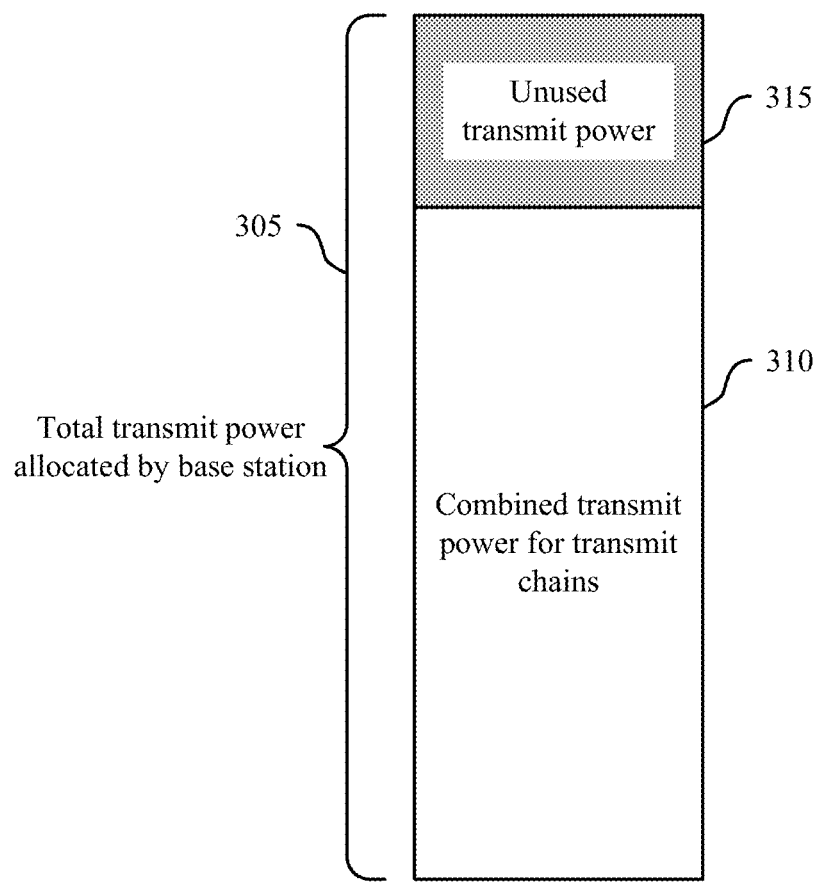
FIG. 3 illustrates an example of a diagram that supports power allocation for subband precoding in accordance with aspects of the present disclosure.

FIG. 3 illustrates an example of a diagram 300 that supports power allocation for subband precoding in accordance with aspects of the present disclosure. In some examples, the diagram 300 may implement aspects of the wireless communications systems 100 and 200. The diagram 300 illustrates an example of how a total transmit power 305 allocated by a base station (e.g., base station 205) may be allocated between PRGs and/or transmit chains of the UE (e.g., UE 210).

In some cases, a UE may be equipped with one or more transmit chains (e.g., N transmit chains). When the UE is equipped with more than one transmit chain, power allocation may be more difficult than when the UE is equipped with a single transmit chain. For example, each transmit chain may have an upper-limit for the amount of transmit power (e.g., $P_{n,max}$) output by the transmit chain. In some cases, the upper-limit for each transmit chain may be different. The upper-limit of the transmit power may be an example of a maximum transmit power.

The base station may allocate a plurality of resource blocks (e.g., M resource blocks) for an uplink transmission. The base station may allocate the plurality of resource blocks using a control message. The control message may also include a total transmit power 305 (e.g., $P_{total}$) of the uplink transmission. The plurality of resource blocks may be grouped into a number of PRGs (e.g., K PRGs) with a precoding matrix $Q_k$ specified for each PRG. In some cases, the precoding matrix $Q_k$ may be an N×L matrix, where L may be the number of MIMO layers for the uplink transmission. In such examples, each column of the precoding matrix $Q_k$ may be a precoder for a MIMO layer of the uplink transmission. The precoding matrix $Q_k$ may be unit norm such that $\|Q_k\|^2=1$. In some cases, the base station may provide the precoding matrix $Q_k$ to the UE (e.g., through control signaling).

The UE may be configured to determine a set of power allocation factors (e.g., $w_1, w_2, \ldots, w_k$) for each PRG so that the UE may use as much of the total transmit power 305 (e.g., $P_{total}$) of the uplink transmission as possible. Once this set of power allocation factors is determined, the power allocated to the kth PRG may be given by $w_k P_{total}$.

In some cases, power allocation may be closely related to (e.g., equivalent to) precoder scaling. In such cases, the UE may determine a set of scaling factors (e.g., $r_1, r_2, \ldots, r_k$) to apply to the precoding matrices such that the UE may efficiently allocate the total transmit power 305 between the PRGs associated with the uplink transmission and/or the transmit chains of the UE. Once the scaling factors are determined, the UE may apply the scaling factors to the precoding matrix $Q_k$ such that precoder used for the transmission of a kth PRG of the uplink transmission is given by $r_k Q_k$. The scaling factors (e.g., $r_1, r_2, \ldots, r_k$) for the precoders may be set such that $r_k^2 \|Q_k\|^2 = w_k P_{total}$. In some cases, if $\|Q_k\|^2=1$, then $w_k=r_k^2/P_{total}$.

In some cases, splitting the total transmit power 305 between the transmit chains may yield a combined transmit power 310 that is less than the total transmit power 305. For example, if the total transmit power 305 is to be split evenly between three transmit chains, the proposed transmit power for a given transmit chain may be a first value. If the upper-limit for the amount of transmit power (e.g., $P_{n,max}$) output by a given transmit chain is less than the first value of the proposed transmit power, some transmit power may remain unused or unallocated (e.g., unused transmit power 315). Such situations may occur, in some cases, even though other transmit chains of the UE may have additional power headroom.

In some cases, the issue of maximizing the amount of total transmit power used by the UE for an uplink transmission and allocating the transmit power across PRGs in a manner that improves efficiencies of the uplink communication (e.g., evenly), may be posed as an optimization problem. Such an optimization problem may be a max-min optimization problem with linear and/or quadratic constraints. The max-min portion may be used to ensure a balanced power allocation across all PRGs while also using residual power that may be left unused with other methods. Such an optimization problem may potentially be solved using iterative methods. A UE, however, may not be configured to solve such an optimization problem due to power constraints, computational resource constraints, or time constraints (e.g., latency requirements), or a combination thereof. The techniques described herein implement a heuristic approach to solve the power allocation problem.

Techniques are described herein for allocating transmit power between transmit chains and/or PRGs to reduce the amount of allocated transmit power that is unused. A two-stage approach to determining scaling factors (e.g., $r_1, r_2, \ldots, r_k$) may be implemented. During a first stage, the UE may determine precoding scaling factors for each PRG associated with each transmit chain of the UE. During a second stage, the UE may determine a residual precoding scaling factor to apply to all the PRGs and determine overall scaling factors for each PRG. The residual precoding scaling factor may be configured to account for the unused transmit power 315. The second stage may be configured to refine the scaling factors determined in the first stage such that at least some, if not all, of the unused transmit power 315 is allocated to at least one of the transmit chains. An overall scaling factor for each PRG associated with each transmit chain may be determined using the precoding scaling factors and the residual precoding scaling factor.

Figure 4:
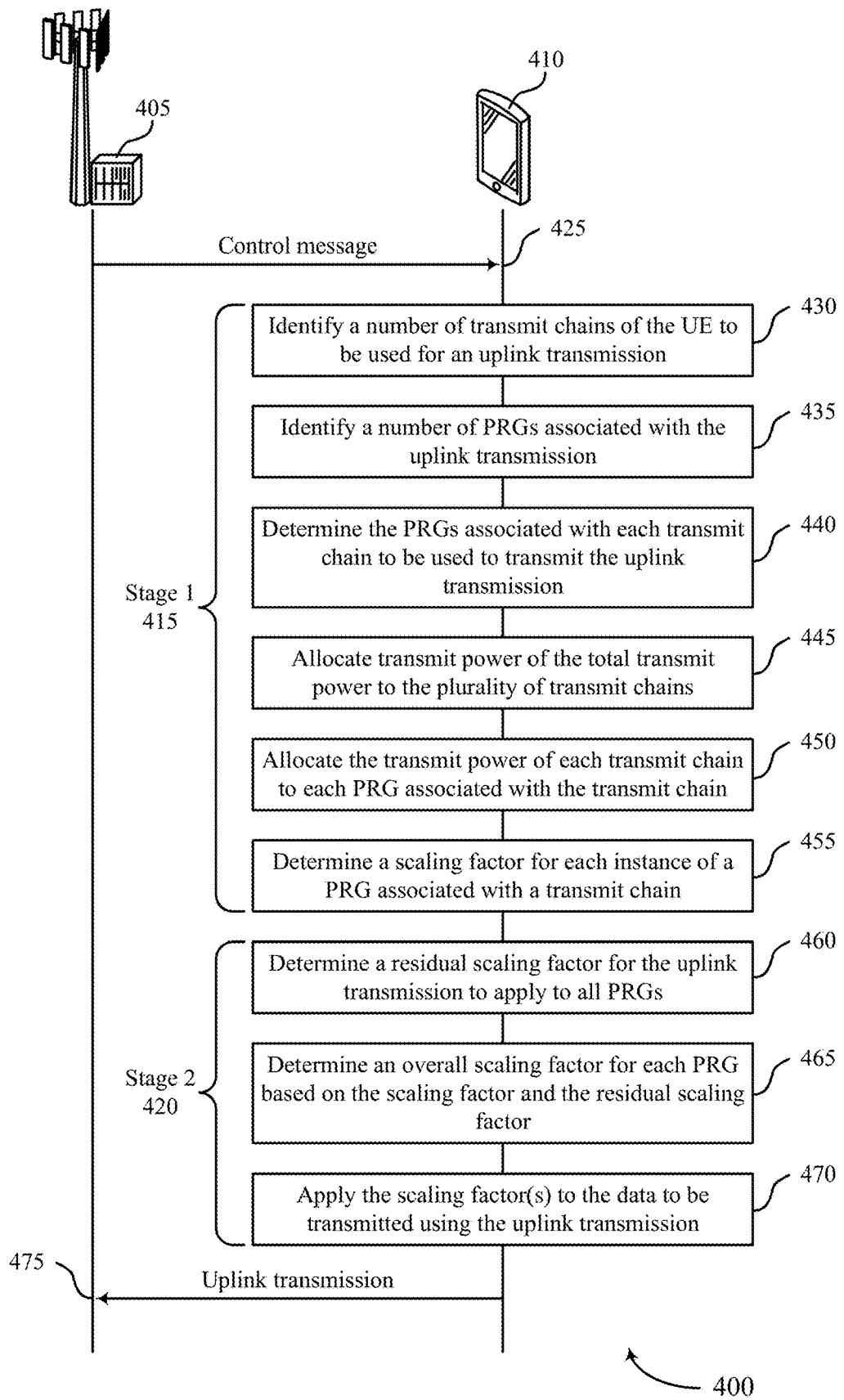
FIG. 4 illustrates an example of a process flow that supports power allocation for subband precoding in accordance with aspects of the present disclosure.

FIG. 4 illustrates an example of a process flow 400 that supports power allocation for subband precoding in accordance with aspects of the present disclosure. In some examples, the process flow 400 may implement aspects of wireless communications systems 100 and 200. The process flow 400 may illustrate a power allocation procedure configured to divide a total transmit power allocated by a base station 405 to a UE 410 for an uplink transmission 475 between different PRGs and/or different transmit chains of the UE 410. The process flow 400 may illustrate functions performed by and signals exchanged between the base station 405 and the UE 410. The base station 405 may be an example of the base stations 105 and 205 described with reference to FIGS. 1 and 2. The UE 410 may be an example of the UEs 115 and 210 described with reference to FIGS. 1 and 2.

The process flow 400 may include a first stage 415 and a second stage 420. During a first stage 415, the UE 410 may determine precoding scaling factors (e.g., $s_1, s_2, \ldots, s_N$) for each PRG associated with each transmit chain of the UE 410 to be used to transmit the uplink transmission 475. During the first stage 415, the UE 410 may be configured to determine a transmit power that each transmit chain can allocate to a PRG associated with that transmit chain. During the second stage 420, the UE 410 may determine a residual precoding scaling factor (e.g., s) for the uplink transmission 475 to apply to all the PRGs associated with each transmit chain of the UE 410. The UE 410 may determine an overall scaling factor for each PRG associated with each transmit chain (e.g., $r_1, r_2, \ldots r_k$) using the precoding scaling factors (e.g., $s_1, s_2, \ldots, s_N$) and the residual precoding scaling factor (e.g., s). For example, the overall scaling factor for the kth PRG may be given by $r_k = \bar{s} s_k$. The UE may apply the overall precoding scaling factors to precoding matrices associated with the uplink transmission 475 and/or other data and determine the power allocation per PRG. In some cases, the procedures described herein may be performed in a single stage or without reference to stages.

The base station 405 may transmit a control message 425 to allocate communication resources to the UE 410 for an uplink transmission 475. The control message may include information that allocates a number of resource blocks for the uplink transmission 475, information about a total transmit power for the uplink transmission 475, information about one or more precoding matrices for the uplink transmission 475, or PRGs of the resource blocks, or a combination thereof. The base station 405 may identify communication resources to allocate to the UE 410 based on receiving a scheduling request from the UE 410. The control message 425 may be an example of a scheduling grant. In some cases, the control message 425 may be communicated using a physical downlink control channel (PDCCH).

At block 430, the UE 410 may identify a number of transmit chains of the UE 410 to be used for the uplink transmission 475. After receiving the control message 425, the UE 410 may identify the communication resources allocated to the UE 410 for the uplink transmission 475. The UE 410 may also identify other information related to the uplink transmission 475 from the control message 425 (e.g., a total transmit power for the uplink transmission 475 or a precoding matrix for the uplink transmission 475). The UE 410 may identify a number of MIMO layers to be used to transmit the uplink transmission 475. In some cases, the number of transmit chains to be used to transmit the uplink transmission 475 may be based on the number of MIMO layers. In some cases, the UE 410 may identify all of its transmit chains for use to transmit the uplink transmission 475. In some cases, the UE 410 may identify some, but not all, of its transmit chains for use to transmit the uplink transmission 475. In some cases, the UE 410 may identify one of its transmit chains for use to transmit the uplink transmission 475. In some cases, the UE 410 may be configured to use N transmit chains to transmit the uplink transmission 475.

At block 435, the UE 410 may identify a number of PRGs associated with the uplink transmission 475. The communication resources (e.g., resource blocks) allocated by the base station 405 may be divided into PRGs. A PRG may include one or more consecutive physical resource blocks (PRBs). In some cases, a PRG may be a subband of a set of resources allocated to the UE 410 by the base station 405 for the uplink transmission 475. In some cases, a unique precoder matrix may be used to precode each subband or each PRG associated with the uplink transmission 475.

The control message 425 may include information about the PRGs associated with the uplink transmission 475. In such cases, the UE 410 may identify the number of PRGs based on the information in the control message 425. In some cases, the UE 410 may divide up the resource blocks allocated to the uplink transmission 475 into PRGs. In such cases, the UE 410 may identify the number of PRGs based on dividing up the resource blocks allocated to the uplink transmission 475. Resource blocks of the communication resources allocated by the base station 405 may be grouped into K PRGs.

At block 440, the UE 410 may determine which PRGs are associated with each transmit chain of the UE 410 to be used to transmit the uplink transmission 475. When transmitting the uplink transmission 475, the UE 410 may use one or more transmit chains to transmit a PRG. In some cases, a transmit chain may be used to transmit a single PRG. In some cases, a transmit chain may be used to transmit more than one PRG. Similarly, a PRG may be transmitted by two or more transmit chains. The UE 410 may use Equation 1 to determine a number of PRGs that are to be transmitted by any given transmit chain.

$$K_n = \Sigma_{k=1}^{K} I[\|Q_k(n,:)\|^2 > 0] \quad (1)$$

In Equation 1, $K_n$ may denote the number of PRGs a nth transmit chain is configured to transmit; I[.] may denote the indicator function; $Q_k(n,:)$ may denote the nth row of precoder matrix $Q_k$; k may denote the kth PRG associated with the uplink transmission 475; and K may denote the total number of PRGs associated with the uplink transmission 475. Equation 1 may be used to calculate a $K_n$ value for each transmit chain to be used to transmit the uplink transmission 475.

In some cases, the UE 410 may determine a total number of instances of PRGs that are associated with the transmit chains. For example, if the UE 410 is going to use two transmit chains to transmit three PRGs, the first PRG may be transmitted by the first transmit chain, a first portion of the second PRG may be transmitted by the first transmit chain, a second portion of the second PRG may be transmitted by a second transmit chain, and a third PRG may be transmitted by the second transmit chain.

In such examples, there may be multiple instances of PRGs associated with transmit chains. A first instance may be where the first PRG is associated with the first transmit chain, a second instance may be where the second PRG is associated with the first transmit chain, a third instance may be where the second PRG is associated with the second transmit chain, and a fourth instance may be where the third PRG is associated with the second transmit chain. The UE 410 may use Equation 2 to determine a total number of instances of PRGs associated with transmit chains.

$$K_{sum} = \Sigma_{n=1}^{K} K_n \quad (2)$$

In Equation 2, $K_{sum}$ may denote the total number of instances of PRGs associated with transmit chains; $K_n$ may denote the number of PRGs a nth transmit chain is configured to transmit; n may denote the nth transmit chain associated with the uplink transmission 475; and K may denote the total number of PRGs associated with the uplink transmission 475. As such, in some cases, a single PRG may be associated with multiple transmit chains of the UE.

At block 445, the UE 410 may allocate transmit powers of the total transmit power to the plurality of transmit chains. In effect, the UE 410 may determine how to divide the total transmit power allocated by the base station 405 among the N transmit chains of the UE 410 to be used to transmit the uplink transmission 475. The UE 410 may divide the total transmit power between the transmit chains based on the number of instances of PRGs associated with the transmit chains. In some cases, the UE 410 may use Equation 3 to determine the transmit power allocated to each transmit chain.

$$P_n = \min\left(\frac{K_n P_{total}}{K_{sum}}, P_{n,max}\right) \quad (3)$$

In Equation 3, $P_n$ may denote the initial transmit power allocated to the nth transmit chain of the UE 410; $K_n$ may denote the number of PRGs a nth transmit chain is configured to transmit; $K_{sum}$ may denote total number of instances of PRGs associated with transmit chains; $P_{total}$ may denote the total transmit power allocated by the base station 405 for transmitting the uplink transmission 475; and $P_{n,max}$ may denote a maximum transmit power of the nth transmit chain. In some cases, $P_n$ may be an example of a power budget and may be referred to as a power budget.

The transmit power allocated to a given transmit chain (e.g., $P_n$) of the UE 410 may be proportional to the number of PRGs (e.g., $K_n$) configured to be transmitted by that given transmit chain, even when a PRG is associated with multiple transmit chains. Using a ratio such as $K_n/K_{sum}$ to allocate the total transmit power between transmit chains may be advantageous by allowing the power to be divided more equally across all the transmit chains, as compared to using the ratio 1/N, where N represents the number of transmit chains to be used by the UE 410 to transmit the uplink transmission 475. For example, when there is an asymmetry (e.g., a large asymmetry) in the number of PRGs associated with each transmit chain, the ratio 1/N may over-allocate power to some transmit chains and under-allocate power to other transmit chains. In some cases, the UE 410 may use other relationships or ratios to divide the total transmit power between transmit chains of the UE 410.

The UE 410 may also take into account that the transmit chains may have different operational limits when determining the transmit power allocated to each transmit chain. For example, the UE 410 may compare a proposed transmit power for a transmit chain (as represented by $K_n P_{total}/K_{sum}$ in Equation 3) to a maximum transmit power of that same transmit chain (e.g., $P_{n,max}$). If the UE 410 determines that the proposed transmit power for the transmit chain exceeds the maximum transmit power of the transmit chain, the UE 410 may determine that transmit power allocated to the transmit chain is the maximum transmit power. Using this determination, the UE 410 may avoid allocating more power to a transmit chain than the transmit chain can use, thereby allowing some transmit power of the total transmit power to go unused or to be allocated to other transmit chains that have power headroom to use the transmit power. Such an operation may also allow a UE 410 to adjust the transmit power when transmit chains may be powered by power amplifiers with different output power ratings. Such procedures may allow a UE 410 to account for a heterogeneous mix of power amplifiers. For example, the UE 410 may allocate a first transmit power to a first transmit chain and a second transmit power different than the first transmit power to a second transmit chain based on the first transmit chain having a different power output rating than the second transmit chain. In such examples, the scaling factor for each PRG may be based on the second transmit power being different than the first transmit power. In some cases, a first proposed transmit power for a first transmit chain may be different than a second proposed transmit power for a second transmit chain. For example, this may occur when a different number of PRGs are associated with each transmit chain.

At block 450, the UE 410 may allocate the transmit power of each transmit chain (e.g., $P_n$) to each PRG associated with the transmit chain. The UE 410 may assign a transmit power to each PRG associated with the transmit chain. The UE 410 may perform this operation for every transmit chain configured to be used to transmit the uplink transmission 475. In some cases, the UE 410 may assign each PRG associated with a transmit chain equal amounts of transmit power. In such cases, the UE 410 may allocate a power budget of $P_n/K_n$ to each PRG associated with the nth transmit chain.

At block 455, the UE 410 may determine the scaling factors for each instance of a PRG associated with a transmit chain. For example, the UE 410 may determine the precoding scaling factors (e.g., $s_1, s_2, \ldots, s_k$) based on the transmit powers being allocated to each instance of a PRG associated with each transmit chain. The UE 410 may use Equation 4 to determine the scaling factors $s_k$ for the PRGs.

$$s_k^2 = \min_{n.s.t. \|Q_k(n,:)\|^2 > 0} \left(\frac{P_n}{K_n \|Q_k(n,:)\|^2}\right) \quad (4)$$

In some cases, $s_k^2 \|Q_k(n,:)\|^2$ may denote the power used by a kth PRG of a nth transmit chain. In some cases, the power used by a kth PRG of a nth transmit chain may not exceed the transmit power determined at block 450. In Equation 4, $s_k$ may denote the precoding scaling factor for the kth PRG; $K_n$ may denote the number of PRGs a nth transmit chain is configured to transmit; $Q_k(n,:)$ may denote the nth row of precoder matrix $Q_k$; k may denote the kth PRG associated with the uplink transmission 475; and $P_n$ may denote the transmit power allocated to the nth transmit chain of the UE 410. In some cases, the scaling factors for each PRG may be different. In some cases, the scaling factors for each PRG may be the same. In some cases, at least one scaling factor may be the same as another scaling factor and at least one scaling factor may be different than another scaling factor.

At block 460, the UE 410 may determine a residual scaling factor (e.g., &) to apply to all PRGs of the uplink transmission 475. The residual scaling factor may be a scalar that is applied to all scaling factors associated with the PRGs. The UE may configure the residual scaling factor to allocate unused transmit power (e.g., unused transmit power 315 as described with reference to FIG. 3) to the various PRGs. In some cases, the UE 410 may determine that a combined transmit power of transmit chains associated with the uplink transmission 475 based on transmit powers allocated to the transmit chains of the UE 410 is less than a total transmit power allocated for the uplink transmission 475 by the base station 405. The residual scaling factor may be based on this determination. In some cases, the UE 410 may determine a difference between a total transmit power of the uplink transmission 475 and a sum of transmit powers allocated to the plurality of PRGs of the uplink transmission 475. The residual scaling factor may be based on this difference.

In some cases, the UE 410 may use the scaling factors (e.g., $s_1, s_2, \ldots, s_k$) determined for each PRG to determine the residual scaling factor. The UE 410 may use Equation 5 to determine the residual scaling factor for the PRGs.

$$\bar{s}^2 = \min\left(\frac{P_{total}}{\sum_{k=1}^{K} s_k^2 \|Q_k\|^2}, \quad \min_{n=1,\ldots,N} \frac{P_{n,max}}{\sum_{k=1}^{K} s_k^2 \|Q_k(n,:)\|^2}\right) \quad (5)$$

In Equation 5, s may denote the residual scaling factor; $S_k$ may denote the precoding scaling factor for the kth PRG of a nth transmit chain; $P_{total}$ may denote the total transmit power allocated by the base station 405 for transmitting the uplink transmission 475; and $P_{n,max}$ may denote a maximum transmit power of the nth transmit chain; $Q_k$ may denote the precoder matrix; $Q_k(n,:)$ may denote the nth row of precoder matrix $Q_k$; k may denote the kth PRG associated with the uplink transmission 475; K may denote the total number of PRGs associated with the uplink transmission 475; n may denote the nth transmit chain configured to be used to transmit the uplink transmission 475; and N may denote the total number of transmit chains to be used to transmit the uplink transmission 475. In some cases, the term $\sum_{k=1}^{K} s_k^2 \|Q_k(n,:)\|^2$ may denote the total power used by the nth transmit chain across all instances of K PRGs associated with the nth transmit chain. The first term of Equation 5 may be used to ensure that the total transmit power (e.g., $P_{total}$) is not violated while determining the residual scaling factor.

At block 465, the UE 410 may determine an overall scaling factor (e.g., $r_1, r_2, \ldots, r_k$) for each PRG. The overall scaling factor for any given PRG may be determined based on the scaling factor for that PRG and the residual scaling factor. In some cases, the overall scaling factor may be a product of the scaling factor and the residual scaling factor. In some cases, the overall scaling factor for the kth PRG may be given by $r_k = \bar{s} s_k$. The transmit power (e.g., effective power) allocated to the kth PRG may be given by $w_k P_{total} = r_k^2 = (\bar{s} s_k)^2$.

At block 470, the UE 410 may apply one or more of the scaling factors to the data to be transmitted using the uplink transmission 475. In some cases, the one or more scaling factors may be reflected in the transmit power allocated to each PRG or each transmit chain. In such cases, the precoding matrices $Q_k$ may remain the same. In other cases, the UE 410 may apply one or more of the scaling factors to the precoder matrices $Q_k$ associated with the uplink transmission 475. The UE 410 may generate a new precoder matrix for each PRG based at least in part on the overall scaling factor for each PRG. The UE 410 may precode information to be included in the uplink transmission 475 using the new precoder matrices. In some cases, the new precoder matrices may be the product of two vectors and/or matrices.

After the UE 410 has precoded and allocated the appropriate transmit power to the data to be transmitted, the UE 410 may transmit, using the one or more transmit chains, the uplink transmission 475. The uplink transmission 475 may be transmitted using the communication resources allocated by the base station 405 to the UE 410 in the control message 425. The uplink transmission 475 may be an example of a message communicated using the physical uplink shared channel (PUSCH) or a message communicated using the physical uplink control channel (PUCCH).

A specific example is described herein of how transmit power may be allocated between PRGs of the UE 410 using the techniques described herein. For example, the UE 410 may be configured to use two transmit chains (e.g., N=2) to transmit three PRGs (e.g., K=3) for the uplink transmission 475. The total transmit power allocated by the base station 405 may be given by $P_{total}$. The maximum transmit power of each transmit chain may be given by $P_{1,max} = P_{2,max} = 2P_{total}$. Initial precoder matrices for the three PRGs may be given as shown in Equations 6, 7, and 8.

$$Q_1 = \begin{bmatrix} 1 \\ 0 \end{bmatrix} \quad (6)$$

$$Q_2 = \begin{bmatrix} 1/\sqrt{2} \\ 1/\sqrt{2} \end{bmatrix} \quad (7)$$

$$Q_3 = \begin{bmatrix} 0 \\ 1 \end{bmatrix} \quad (8)$$

The UE 410 may determine (e.g., using Equation 1) that the number of PRGs associated with a first transmit chain is two (e.g., $K_1=2$) and the number of PRGs associated with a second transmit chain is two (e.g., $K_2=2$). The UE 410 may determine (e.g., using Equation 2) a total number of instances of PRGs associated with transmit chains is four (e.g., $K_{sum}=4$). The UE 410 may determine (e.g., using Equation 3) that the transmit power allocated to first transmit chain is one-half of the total transmit power (e.g., $P_1=P_{total}/2$) and the transmit power allocated to the second transmit chain is one-half of the total transmit power (e.g., $P_2=P_{total}/2$). The UE 410 may allocate the transmit power of each transmit chain to the transmit chain's associated PRGs.

The UE 410 may determine (e.g., using Equation 4) the precoder scaling factors for each PRG. For the first PRG (e.g., k=1), the UE 410 may determine the following: $s_1^2 = P_1/K_1 = P_{total}/4$. For the second PRG (e.g., k=2), the UE 410 may determine the following: $s_2^2 = \min(P_1, P_2) = P_{total}/2$. For the third PRG (e.g., k=3), the UE 410 may determine the following: $s_3^2 = P_2/K_2 = P_{total}/4$.

After determining the scaling factors for each PRG, the UE 410 may determine the residual scaling factor (e.g., s) to be applied to all of the PRGs. The UE 410 may determine (e.g., using Equation 5) the residual scaling factor. Here, in this example, because the maximum transmit power of the transmit chains both exceed the total transmit power (e.g., the maximum transmit power of each transmit chain exceeds the total transmit power), there is no unused power to be allocated and thus $\bar{s}=1$. In other examples, some transmit power may be left unused. In such examples, $\bar{s}$ may equal some value greater than one (e.g., 1.07).

The UE 410 may determine an overall scaling factor for each PRG by taking the product of each scaling factor and the residual scaling factor (e.g., $r_k = \bar{s}s_k$). In some cases, the UE 410 may apply the overall scaling factors during the power allocation phase. In some cases, the UE 410 may determine new precoding matrices for the PRGs by multiplying the initial precoding matrices by their respective overall scaling factors. Such an operation may result in the following precoding matrices for the PRGs as shown in Equations 9, 10, and 11.

$$Q_1 = \begin{bmatrix} \sqrt{P_{total}} \\ 0 \end{bmatrix} \tag{9}$$

$$Q_2 = \sqrt{P_{total}} \begin{bmatrix} 1/2 \\ 1/2 \end{bmatrix} \tag{10}$$

$$Q_3 = \begin{bmatrix} 0 \\ \sqrt{P_{total}} \end{bmatrix} \tag{11}$$

The UE 410 may use these precoding matrices to, in effect, allocate power to the PRGs of the uplink transmission 475. Thus, using these precoding matrices, the power allocation across the three PRGs of the uplink transmission 475 may be given as $P_1 = P_{total}/4$, $P_2 = P_{total}/2$, and $P_3 = P_{total}/4$. By using the techniques described herein, the total transmit power allocated by the base station 405 is more efficiently used and is distributed across the PRGs and transmit chains.

Figure 5:
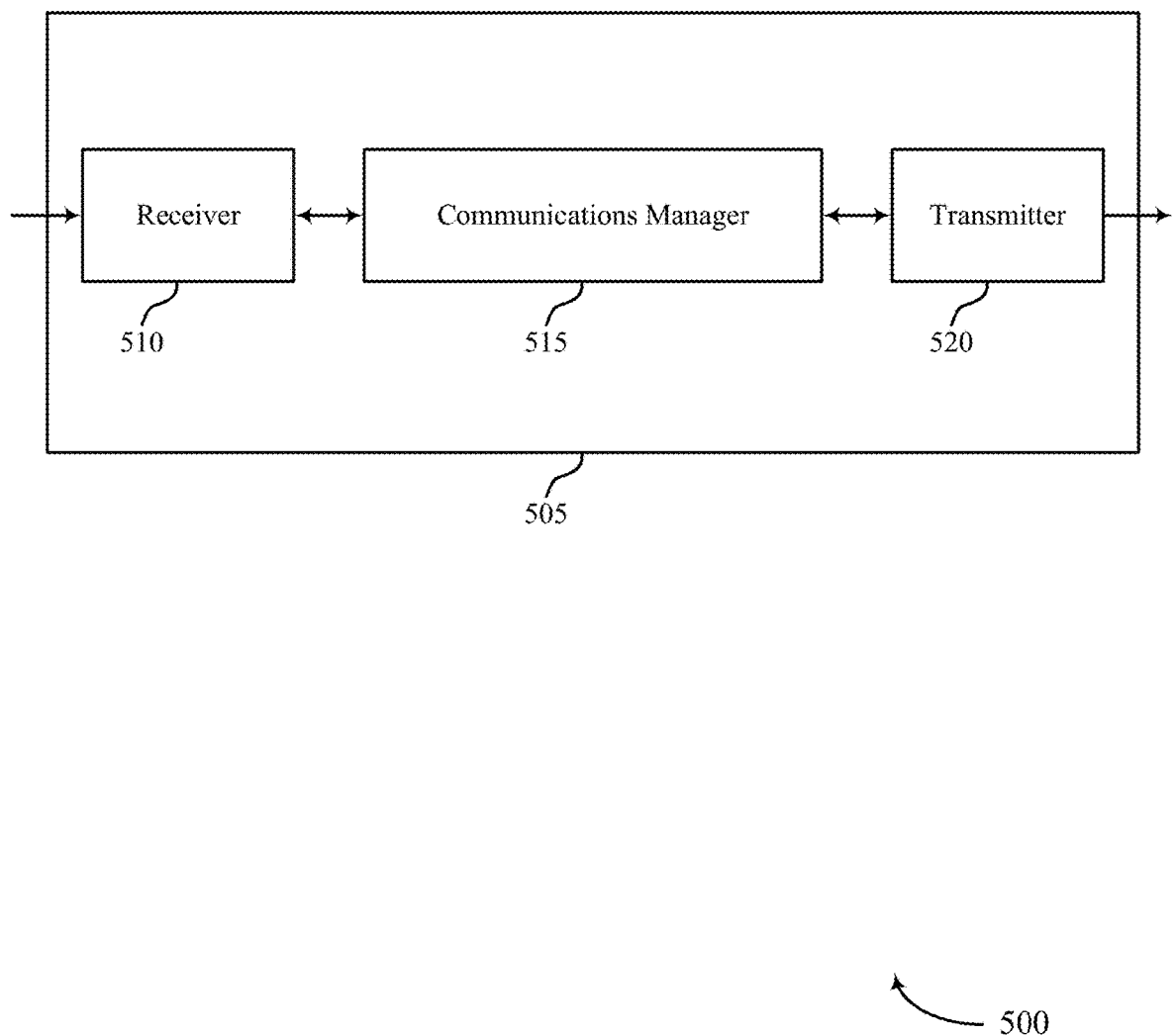
FIGS. 5 and 6 show block diagrams of devices that support power allocation for subband precoding in accordance with aspects of the present disclosure.

FIG. 5 shows a block diagram 500 of a device 505 that supports power allocation for subband precoding in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to power allocation for subband precoding, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may allocate a transmit power to each PRG associated with at least one of a set of transmit chains of a UE to be used to transmit an uplink transmission, transmit the uplink transmission based on the scaling factor for each PRG and the residual scaling factor for the PRGs, determine a scaling factor for each PRG associated with each transmit chain of the transmit chains based on allocating the transmit power to each PRG, and determine a residual scaling factor for the uplink transmission to apply to all the PRGs based on the scaling factor for each PRG.

The communications manager 515 as described herein may be implemented to realize one or more potential advantages. One implementation may allow the device 505 to provide techniques which may support power allocation for subband precoding, among other advantages. For example, the device 505 may include features for reducing the amount of transmit power that is unused, as the device 505 may allocate transmit power between precoding resource groups (PRGs) and/or transmit chains. Additionally or alternatively, the device 505 may include features for efficiently allocating a total transmit power (e.g., between the transmit chains), as the device 505 may determine a set of scaling factors (e.g., precoding scaling factors) for each PRG. Additionally or alternatively, the device 505 may include features for dividing the transmit power more equally across all the transmit chains compared to other techniques, as the device 505 may use a ratio to allocate the total transmit power between transmit chains. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
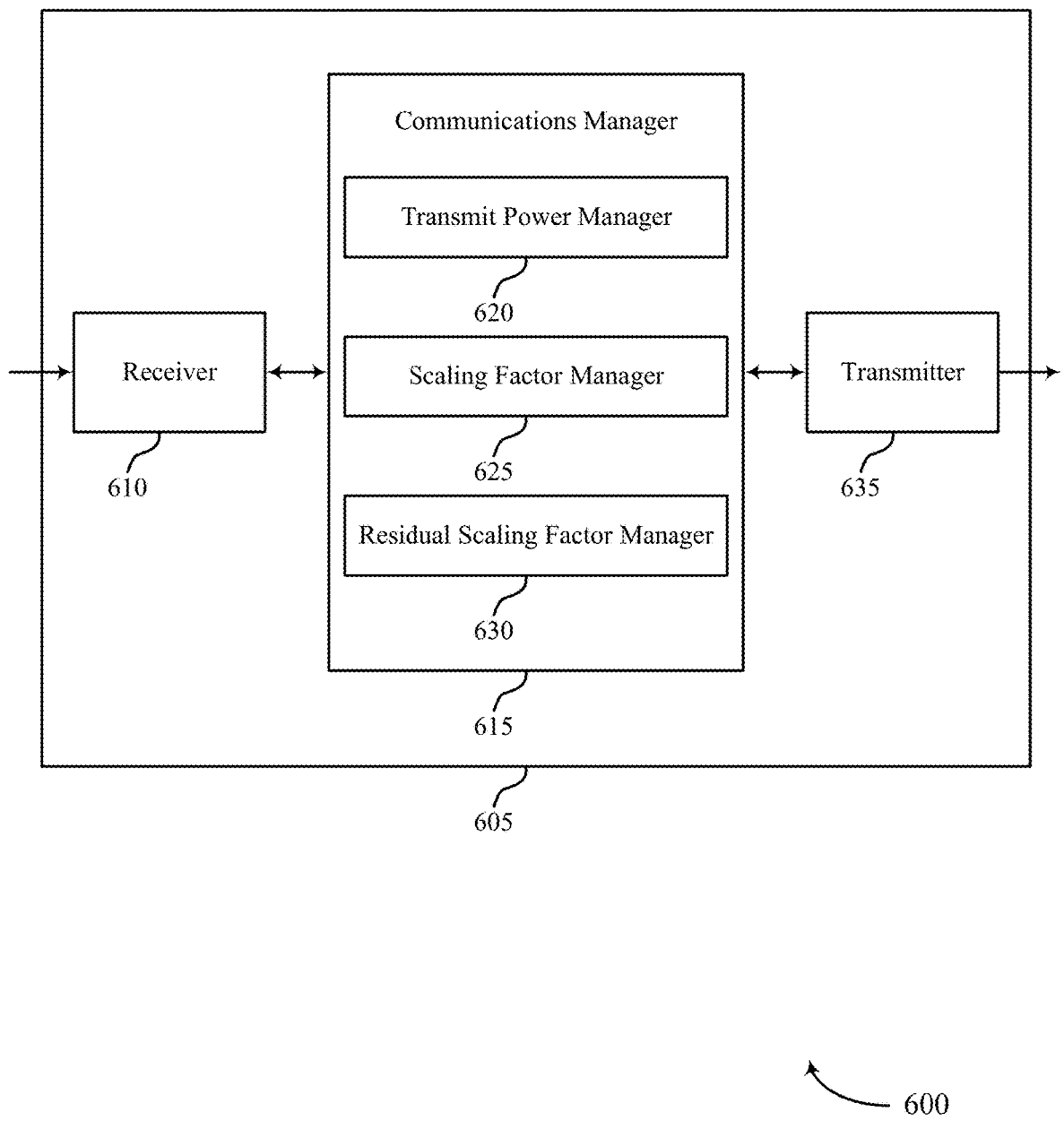

FIG. 6 shows a block diagram 600 of a device 605 that supports power allocation for subband precoding in accordance with aspects of the present disclosure. The device 605 may be an example of aspects of a device 505 or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to power allocation for subband precoding, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a transmit power manager 620, a scaling factor manager 625, and a residual scaling factor manager 630. The communications manager 615 may be an example of aspects of the communications manager 810 described herein.

The transmit power manager 620 may allocate a transmit power to each PRG associated with at least one of a set of transmit chains of a UE to be used to transmit an uplink transmission and transmit the uplink transmission based on the scaling factor for each PRG and the residual scaling factor for the PRGs.

The scaling factor manager 625 may determine a scaling factor for each PRG associated with allocating transmit power to PRGs based at least in part on allocating the transmit power to each PRG.

The residual scaling factor manager 630 may determine a residual scaling factor allocating transmit power to PRGs to apply to all the PRGs based at least in part on the scaling factor for each PRG and allocating the transmit power to each PRG.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas. Accordingly, the described power allocation techniques for subband precoding may promote efficient allocation of a total transmit power (e.g., between PRGs and/or transmit chains) and a reduction in the amount of transmit power that is unused, among other advantages.

Figure 7:
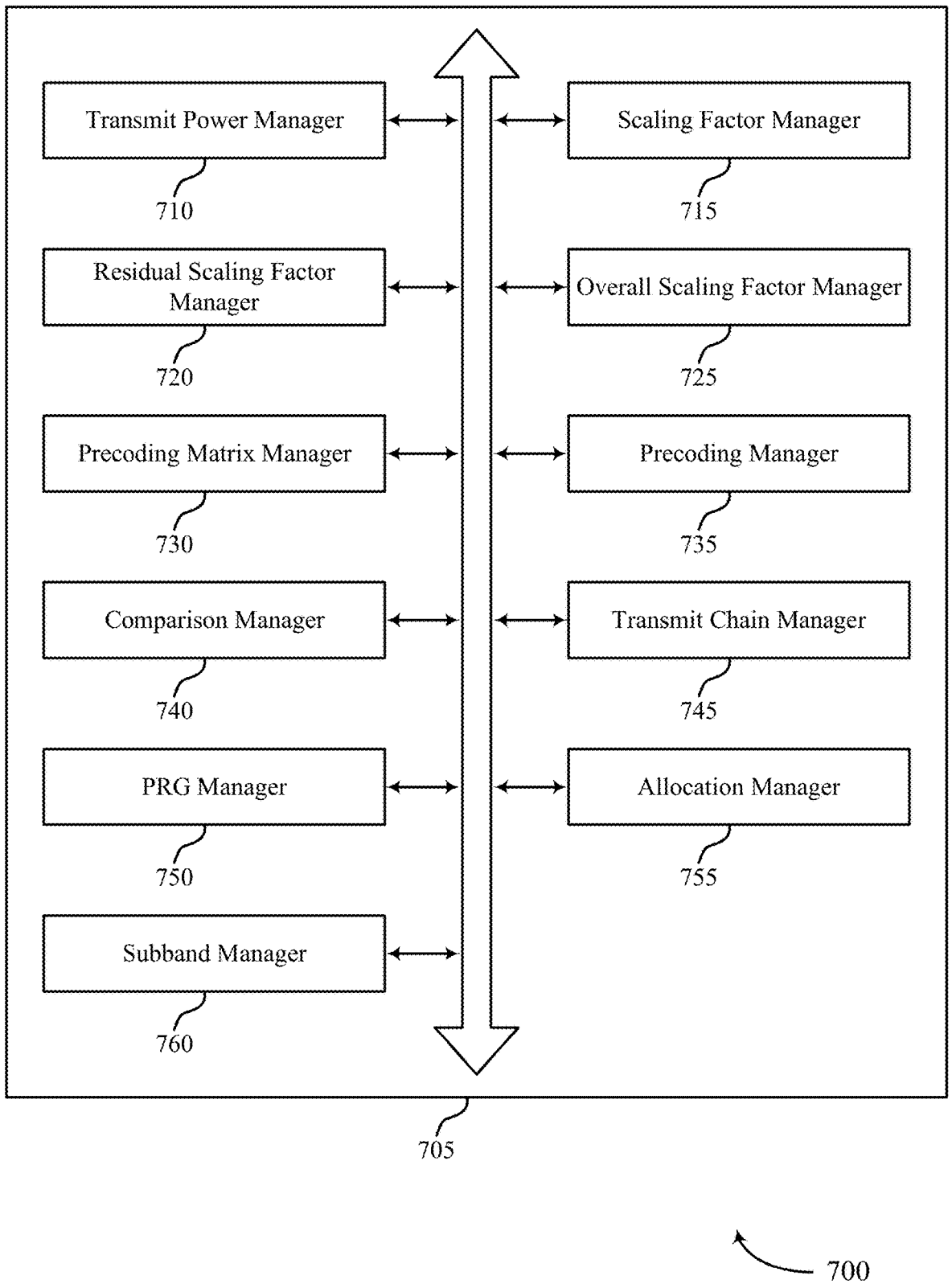
FIG. 7 shows a block diagram of a communications manager that supports power allocation for subband precoding in accordance with aspects of the present disclosure.

FIG. 7 shows a block diagram 700 of a communications manager 705 that supports power allocation for subband precoding in accordance with aspects of the present disclosure. The communications manager 705 may be an example of aspects of a communications manager 515, a communications manager 615, or a communications manager 810 described herein. The communications manager 705 may include a transmit power manager 710, a scaling factor manager 715, a residual scaling factor manager 720, an overall scaling factor manager 725, a precoding matrix manager 730, a precoding manager 735, a comparison manager 740, a transmit chain manager 745, a PRG manager 750, an allocation manager 755, and a subband manager 760. Each of these modules may communicate, directly or indirectly, with one another (e.g., via one or more buses).

The transmit power manager 710 may allocate a transmit power to each PRG associated with at least one of a set of transmit chains of a UE to be used to transmit an uplink transmission. In some examples, the transmit power manager 710 may transmit the uplink transmission based on the scaling factor for each PRG and the residual scaling factor for the PRGs. In some examples, the transmit power manager 710 may determine an initial transmit power for each transmit chain of the transmit chains, where each transmit power allocated to the PRGs associated with the transmit chain may be upper bounded by the initial transmit power assigned to the transmit chain. In some examples, the transmit power manager 710 may allocate a second transmit power to each transmit chain of the transmit chains, where each transmit power allocated to the PRGs associated with the transmit chain may be a subset of the second transmit power allocated to the transmit chain.

In some examples, the transmit power manager 710 may determine an initial transmit power for each transmit chain of the transmit chains based at least in part on a number of PRGs associated with each transmit chain and an output power rating of each transmit chain. In some examples, the transmit power manager 710 may determine an allocation of the initial transmit power to each PRG associated with the transmit chain, where the allocation to each PRG associated with the transmit chain may be upper bounded by the initial transmit power of the transmit chain. In some cases, the scaling factors determined for each PRG may be configured to maximize a transmit power used to transmit a respective PRG without exceeding the initial transmit power assigned to a respective transmit chain associated with the respective PRG.

The transmit power manager 710 may allocate a first transmit power to a first transmit chain. The transmit power manager 710 may allocate a second transmit power different than the first transmit power to a second transmit chain based at least in part on the first transmit chain having a different power output rating than the second transmit chain, where the scaling factor for each PRG may be based at least in part on the second transmit power being different than the first transmit power.

The scaling factor manager 715 may determine a scaling factor for each PRG associated with allocating transmit power to PRGs based at least in part on allocating the transmit power to each PRG. The scaling factor manager 715 may determine a scaling factor for each PRG associated with each transmit chain of the transmit chains based on allocating the transmit power to each PRG. In some cases, the scaling factor may be a precoding scaling factor specific to each PRG associated with the uplink transmission and the residual scaling factor may be a common precoding scaling factor applied to all PRGs associated with the uplink transmission. In some cases, the scaling factor may be a PRG-specific scaling factor that is determined for each PRG. In some cases, the precoding scaling factor specific to each PRG and the common precoding scaling factor may be configured to determine a power allocated to each PRG.

The residual scaling factor manager 720 may determine a residual scaling factor allocating transmit power to PRGs to apply to all the PRGs based at least in part on the scaling factor for each PRG and allocating the transmit power to each PRG. The residual scaling factor manager 720 may determine a residual scaling factor for the uplink transmission to apply to all the PRGs based on the scaling factor for each PRG. In some examples, the residual scaling factor manager 720 may determine a difference between a total transmit power of the uplink transmission and a sum of transmit powers allocated to the set of PRGs of the uplink transmission, where determining the residual scaling factor may be based on the difference. In some examples, the residual scaling factor manager 720 may determine a common scaling factor to apply to all the PRGs associated with the set of transmit chains.

The overall scaling factor manager 725 may determine an overall scaling factor for each PRG of the uplink transmission by determining a product of each scaling factor and the residual scaling factor, where transmitting the uplink transmission may be based on the overall scaling factor. The precoding matrix manager 730 may generate a precoder matrix for each PRG based on the overall scaling factor for each PRG of the uplink transmission. The precoding manager 735 may precode information to be included in the uplink transmission using the precoder matrix, where transmitting the uplink transmission may be based on the precoder matrix.

The comparison manager 740 may determine that a maximum transmit power of a transmit chain of the transmit chains is less than a proposed transmit power for the transmit chain, where determining the initial transmit power for the transmit chain may include determining that the initial transmit power for the transmit chain is the maximum transmit power of the transmit chain based at least in part on determining that the maximum transmit power is less than the of the transmit chain. The comparison manager 740 may determine that a proposed transmit power for a transmit chain of the transmit chains exceeds a maximum transmit power of the transmit chain, where allocating the second transmit power to the transmit chain may include determining that the initial transmit power for the transmit chain is the maximum transmit power of the transmit chain based at least in part on determining that the maximum transmit power is less than the of the transmit chain. In some examples, the comparison manager 740 may identify a first initial transmit power for the transmit chain by dividing a total transmit power of the uplink transmission between each transmit chain of the transmit chains. In some cases, the first initial transmit power for a first transmit chain may be different than a second initial transmit power for a second transmit chain.

The transmit chain manager 745 may identify a number of transmit chains to be used by the UE to transmit the uplink transmission, where allocating the transmit power to each PRG may be based on the number of transmit chains and/or precoders used for each PRG. In some examples, the transmit chain manager 745 may determine a combined transmit power of transmit chains associated with the uplink transmission based on transmit powers allocated to the transmit chains of the UE, where determining the residual scaling factor may be based on the combined transmit power. In some cases, the transmit chain may include a digital-to-analog converter, a power amplifier, and at least one antenna.

The PRG manager 750 may identify a number of PRGs associated with the transmit chain, where allocating the transmit power to each PRG may be based on the number of PRGs associated with the transmit chain. In some cases, a single PRG may be associated with multiple transmit chains of the UE.

The allocation manager 755 may compute a power allocation information for each PRG based at least in part on the overall scaling factor for each PRG of the uplink transmission, where transmitting the uplink transmission may be based at least in part on the power allocation information. The allocation manager 755 may receive, from a base station, a message indicating a total transmit power for the uplink transmission, where allocating the transmit power to each PRG may be based on receiving the message.

The subband manager 760 may identify a set of subbands of a set of resources allocated to the UE by a base station. In some examples, the subband manager 760 may assign a precoder to each subband of the subbands, where allocating the transmit power to each PRG may be based on assigning the precoder to each subband. In some cases, a subband of the subbands may include a transmit chain of the transmit chains.

Figure 8:
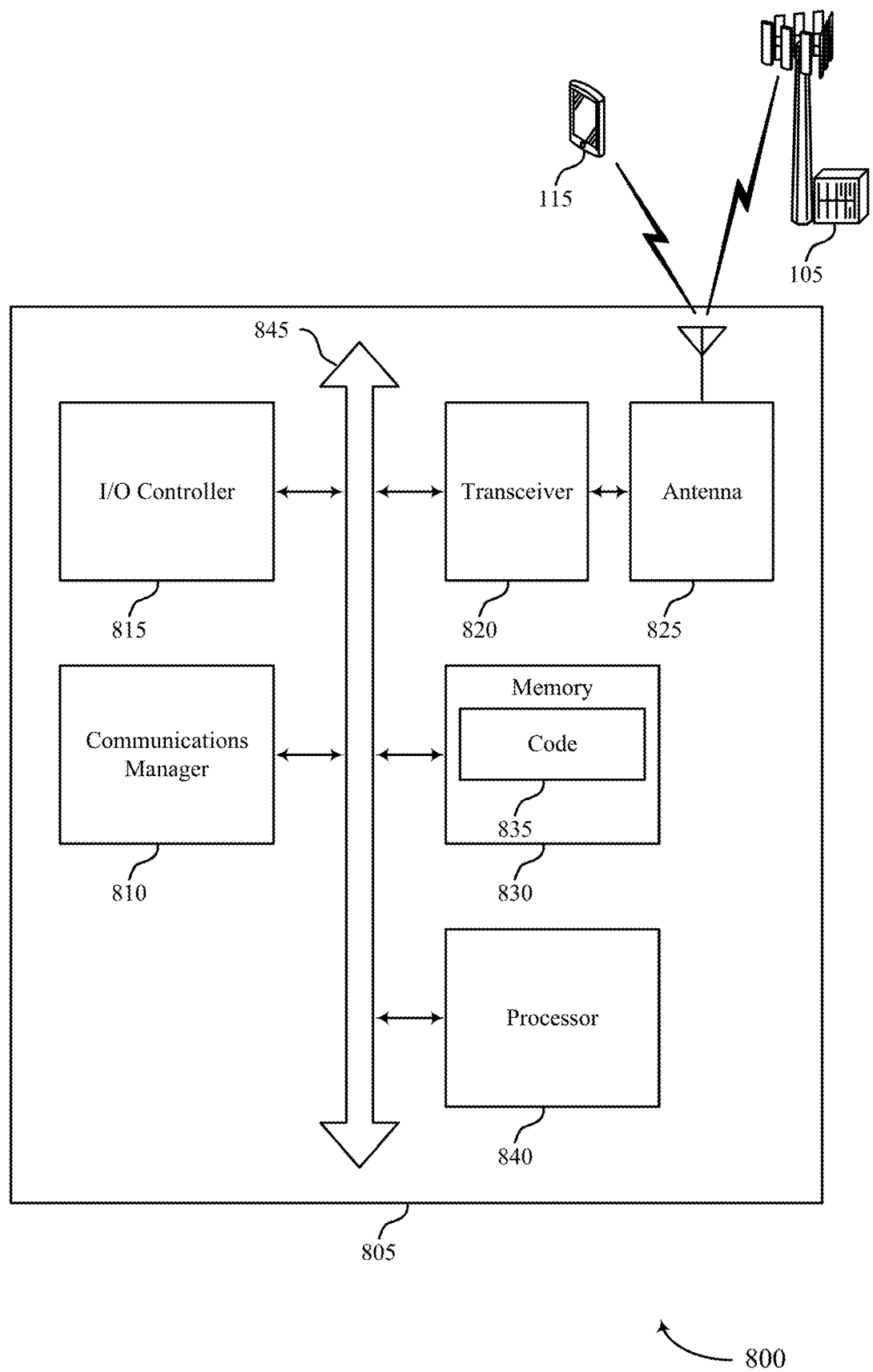
FIG. 8 shows a diagram of a system including a device that supports power allocation for subband precoding in accordance with aspects of the present disclosure.

FIG. 8 shows a diagram of a system 800 including a device 805 that supports power allocation for subband precoding in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may allocate a transmit power to each PRG associated with at least one of a set of transmit chains of a UE to be used to transmit an uplink transmission, transmit the uplink transmission based on the scaling factor for each PRG and the residual scaling factor for the PRGs, determine a scaling factor for each PRG associated with each transmit chain of the transmit chains based on allocating the transmit power to each PRG, and determine a residual scaling factor for the uplink transmission to apply to all the PRGs based on the scaling factor for each PRG.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting power allocation for subband precoding).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
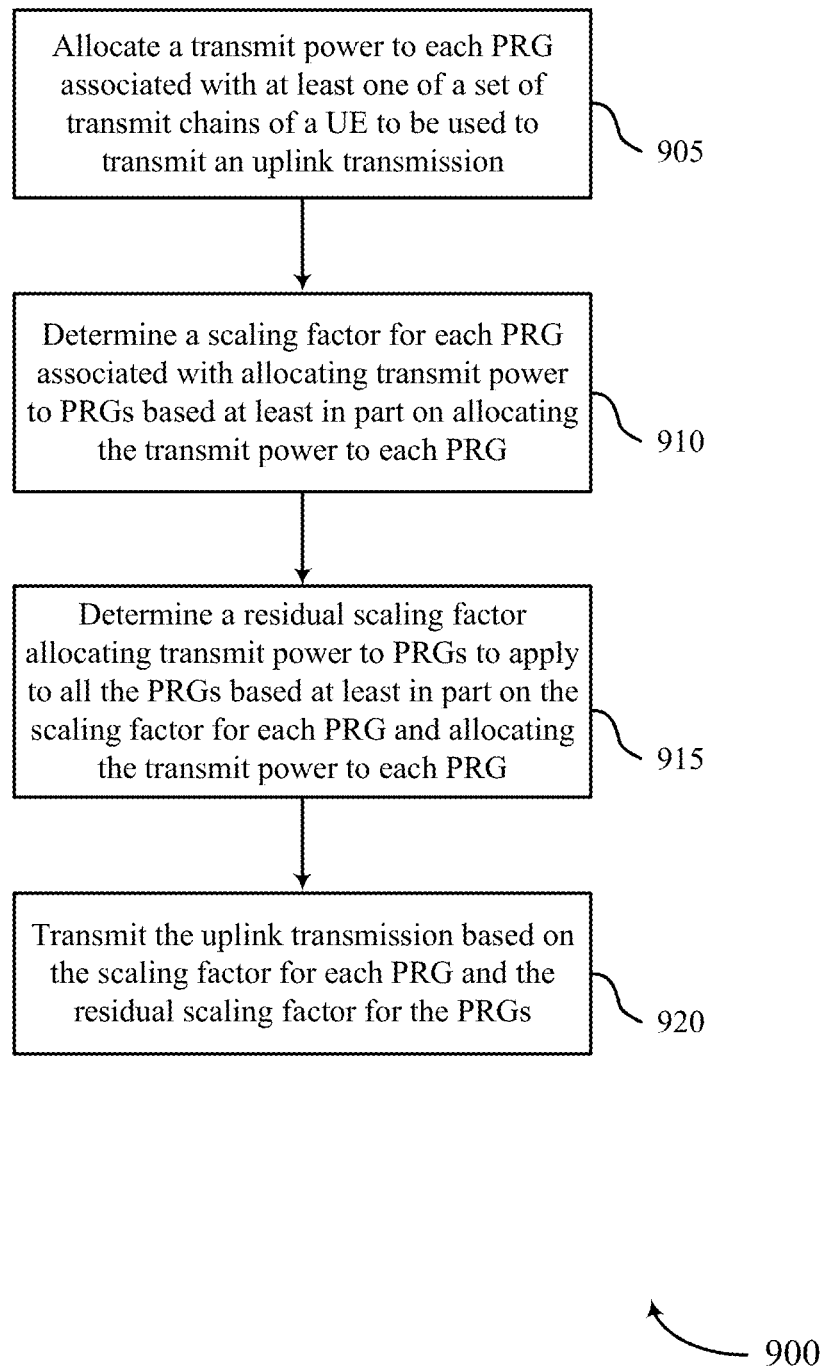
FIGS. 9 and 10 show flowcharts illustrating methods that support power allocation for subband precoding in accordance with aspects of the present disclosure.

FIG. 9 shows a flowchart illustrating a method 900 that supports power allocation for subband precoding in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 905, the UE may allocate a transmit power to each PRG associated with at least one of a set of transmit chains of a UE to be used to transmit an uplink transmission. The operations of 905 may be performed according to the methods described herein. In some examples, aspects of the operations of 905 may be performed by a transmit power manager as described with reference to FIGS. 5 through 8.

At 910, the UE may determine a scaling factor for each PRG associated with allocating transmit power to PRGs based at least in part on allocating the transmit power to each PRG. The operations of 910 may be performed according to the methods described herein. In some examples, aspects of the operations of 910 may be performed by a scaling factor manager as described with reference to FIGS. 5 through 8.

At 915, the UE may determine a residual scaling factor allocating transmit power to PRGs to apply to all the PRGs based at least in part on the scaling factor for each PRG and allocating the transmit power to each PRG. The operations of 915 may be performed according to the methods described herein. In some examples, aspects of the operations of 915 may be performed by a residual scaling factor manager as described with reference to FIGS. 5 through 8.

At 920, the UE may transmit the uplink transmission based on the scaling factor for each PRG and the residual scaling factor for the PRGs. The operations of 920 may be performed according to the methods described herein. In some examples, aspects of the operations of 920 may be performed by a transmit power manager as described with reference to FIGS. 5 through 8.

Figure 10:
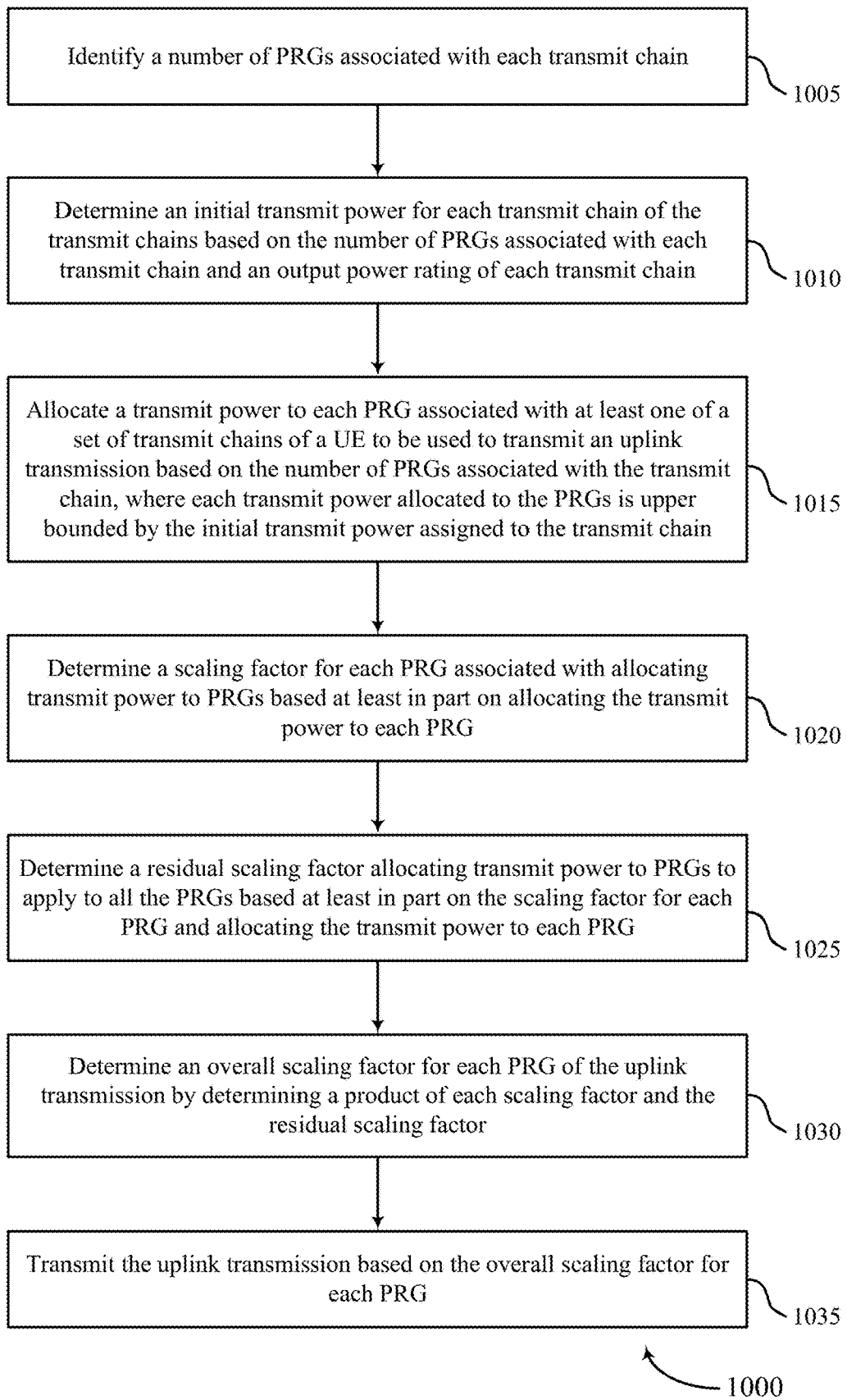

FIG. 10 shows a flowchart illustrating a method 1000 that supports power allocation for subband precoding in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1005, the UE may identify a number of PRGs associated with each transmit chain. The operations of 1005 may be performed according to the methods described herein. In some examples, aspects of the operations of 1005 may be performed by a PRG manager as described with reference to FIGS. 5 through 8.

At 1010, the UE may determine an initial transmit power for each transmit chain of the transmit chains based on the number of PRGs associated with each transmit chain and an output power rating of each transmit chain. The operations of 1010 may be performed according to the methods described herein. In some examples, aspects of the operations of 1010 may be performed by a transmit power manager as described with reference to FIGS. 5 through 8.

At 1015, the UE may allocate a transmit power to each PRG associated with at least one of a set of transmit chains of a UE to be used to transmit an uplink transmission based on the number of PRGs associated with the transmit chain, where each transmit power allocated to the PRGs is upper bounded by the initial transmit power assigned to the transmit chain. The operations of 1015 may be performed according to the methods described herein. In some examples, aspects of the operations of 1015 may be performed by a transmit power manager as described with reference to FIGS. 5 through 8.

At 1020, the UE may determine a scaling factor for each PRG associated with allocating transmit power to PRGs based at least in part on allocating the transmit power to each PRG. The operations of 1020 may be performed according to the methods described herein. In some examples, aspects of the operations of 1020 may be performed by a scaling factor manager as described with reference to FIGS. 5 through 8.

At 1025, the UE may determine a residual scaling factor allocating transmit power to PRGs to apply to all the PRGs based at least in part on the scaling factor for each PRG and allocating the transmit power to each PRG. The operations of 1025 may be performed according to the methods described herein. In some examples, aspects of the operations of 1025 may be performed by a residual scaling factor manager as described with reference to FIGS. 5 through 8.

At 1030, the UE may determine an overall scaling factor for each PRG of the uplink transmission by determining a product of each scaling factor and the residual scaling factor. The operations of 1030 may be performed according to the methods described herein. In some examples, aspects of the operations of 1030 may be performed by an overall scaling factor manager as described with reference to FIGS. 5 through 8.

At 1035, the UE may transmit the uplink transmission based on the overall scaling factor for each PRG. The operations of 1035 may be performed according to the methods described herein. In some examples, aspects of the operations of 1035 may be performed by a transmit power manager as described with reference to FIGS. 5 through 8.

Accordingly, the described operations of method 1000 as implemented by the UE or its components may promote improved power allocation techniques for subband precoding which may provide efficient allocation of a total transmit power (e.g., between PRGs and/or transmit chains) and a reduction in the amount of transmit power that is unused, among other advantages.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication, comprising:
    allocating a transmit power to each precoding resource group (PRG) associated with at least one of a plurality of transmit chains of a user equipment (UE) to be used to transmit an uplink transmission;
    determining a scaling factor for each PRG associated with allocating transmit power to PRGs based at least in part on allocating the transmit power to each PRG;
    determining a residual scaling factor allocating transmit power to PRGs to apply to all the PRGs based at least in part on the scaling factor for each PRG and allocating the transmit power to each PRG; and
    transmitting the uplink transmission based at least in part on the scaling factor for each PRG and the residual scaling factor for the PRGs.

2. The method of claim 1, further comprising:
    determining an overall scaling factor for each PRG of the uplink transmission by determining a product of each scaling factor and the residual scaling factor, wherein transmitting the uplink transmission is based at least in part on the overall scaling factor.

3. The method of claim 2, further comprising:
    computing a power allocation information for each PRG based at least in part on the overall scaling factor for each PRG of the uplink transmission, wherein transmitting the uplink transmission is based at least in part on the power allocation information.

4. The method of claim 1, further comprising:
    determining a difference between a total transmit power of the uplink transmission and a sum of transmit powers allocated to the plurality of PRGs of the uplink transmission, wherein determining the residual scaling factor is based at least in part on the difference.

5. The method of claim 1, further comprising:
    determining an initial transmit power for each transmit chain of the transmit chains based at least in part on a number of PRGs associated with each transmit chain and an output power rating of each transmit chain; and
    determining an allocation of the initial transmit power to each PRG associated with the transmit chain, wherein the allocation to each PRG associated with the transmit chain is upper bounded by the initial transmit power of the transmit chain.

6. The method of claim 5, wherein the scaling factors determined for each PRG are configured to maximize a transmit power used to transmit a respective PRG without exceeding the initial transmit power assigned to a respective transmit chain associated with the respective PRG.

7. The method of claim 5, further comprising:
    identifying a first initial transmit power for the transmit chain by dividing a total transmit power of the uplink transmission between each transmit chain of the transmit chains.

8. The method of claim 7, wherein the first initial transmit power for the first transmit chain is different than a second initial transmit power for a second transmit chain.

9. The method of claim 1, wherein determining the residual scaling factor further comprises:
    determining a common scaling factor to apply to all the PRGs associated with the plurality of transmit chains.

10. The method of claim 1, further comprising:
    identifying a number of transmit chains to be used by the UE to transmit the uplink transmission, wherein allocating the transmit power to each PRG is based at least in part on the number of transmit chains and precoders used for each PRG.

11. The method of claim 1, further comprising:
    identifying a number of PRGs associated with the transmit chain, wherein allocating the transmit power to each PRG is based at least in part on the number of PRGs associated with the transmit chain.

12. The method of claim 1, further comprising:
    determining a combined transmit power of transmit chains associated with the uplink transmission based at least in part on transmit powers allocated to the transmit chains of the UE, wherein determining the residual scaling factor is based at least in part on the combined transmit power.

13. The method of claim 1, further comprising:
    receiving, from a base station, a message indicating a total transmit power for the uplink transmission, wherein allocating the transmit power to each PRG is based at least in part on receiving the message.

14. The method of claim 1, further comprising:
    identifying a plurality of subbands of a set of resources allocated to the UE by a base station; and
    assigning a precoder to each subband of the subbands, wherein allocating the transmit power to each PRG is based at least in part on assigning the precoder to each subband.

15. The method of claim 1, wherein the transmit chain comprises a digital-to-analog converter, a power amplifier, and at least one antenna.

16. The method of claim 1, wherein:
the scaling factor is a precoding scaling factor specific to each PRG associated with the uplink transmission; the residual scaling factor is a common precoding scaling factor applied to all PRGs associated with the uplink transmission; and
the precoding scaling factor specific to each PRG and the common precoding scaling factor are configured to determine a power allocated to each PRG.

17. The method of claim 1, wherein a single PRG is associated with multiple transmit chains of the UE.

18. The method of claim 1, wherein the scaling factor is a PRG-specific scaling factor that is determined for each PRG.

19. The method of claim 1, further comprising:
allocating a first transmit power to a first transmit chain; and
allocating a second transmit power different than the first transmit power to a second transmit chain based at least in part on the first transmit chain having a different power output rating than the second transmit chain, wherein the scaling factor for each PRG is based at least in part on the second transmit power being different than the first transmit power.

20. An apparatus for wireless communication, comprising:
a processor,
memory in electronic communication with the processor; and
instructions stored in the memory and executable by the processor to cause the apparatus to:
allocate a transmit power to each precoding resource group (PRG) associated with at least one of a plurality of transmit chains of a user equipment (UE) to be used to transmit an uplink transmission;
determine a scaling factor for each PRG associated with allocating transmit power to PRGs based at least in part on allocating the transmit power to each PRG;
determine a residual scaling factor allocating transmit power to PRGs to apply to all the PRGs based at least in part on the scaling factor for each PRG and allocating the transmit power to each PRG; and
transmit the uplink transmission based at least in part on the scaling factor for each PRG and the residual scaling factor for the PRGs.

21. The apparatus of claim 20, wherein the instructions are further executable by the processor to cause the apparatus to:
determine an overall scaling factor for each PRG of the uplink transmission by determining a product of each scaling factor and the residual scaling factor, wherein transmitting the uplink transmission is based at least in part on the overall scaling factor.

22. The apparatus of claim 21, wherein the instructions are further executable by the processor to cause the apparatus to:
compute a power allocation information for each PRG based at least in part on the overall scaling factor for each PRG of the uplink transmission, wherein transmitting the uplink transmission is based at least in part on the power allocation information.

23. The apparatus of claim 20, wherein the instructions are further executable by the processor to cause the apparatus to:
determine a difference between a total transmit power of the uplink transmission and a sum of transmit powers allocated to the plurality of PRGs of the uplink transmission, wherein determining the residual scaling factor is based at least in part on the difference.

24. The apparatus of claim 20, wherein the instructions are further executable by the processor to cause the apparatus to:
determine an initial transmit power for each transmit chain of the transmit chains based at least in part on a number of PRGs associated with each transmit chain and an output power rating of each transmit chain; and
determine an allocation of the initial transmit power to each PRG associated with the transmit chain, wherein the allocation to each PRG associated with the transmit chain is upper bounded by the initial transmit power of the transmit chain.

25. The apparatus of claim 24, wherein the scaling factors determined for each PRG are configured to maximize a transmit power used to transmit a respective PRG without exceeding the initial transmit power assigned to a respective transmit chain associated with the respective PRG.

26. The apparatus of claim 24, wherein the instructions are further executable by the processor to cause the apparatus to:
identify a first initial transmit power for the transmit chain by dividing a total transmit power of the uplink transmission between each transmit chain of the transmit chains.

27. The apparatus of claim 26, wherein the first initial transmit power for the first transmit chain is different than a second initial transmit power for a second transmit chain.

28. The apparatus of claim 20, wherein the instructions to determine the residual scaling factor further are executable by the processor to cause the apparatus to:
determine a common scaling factor to apply to all the PRGs associated with the plurality of transmit chains.

29. An apparatus for wireless communication, comprising:
means for allocating a transmit power to each precoding resource group (PRG) associated with at least one of a plurality of transmit chains of a user equipment (UE) to be used to transmit an uplink transmission;
means for determining a scaling factor for each PRG associated with allocating transmit power to PRGs based at least in part on allocating the transmit power to each PRG;
means for determining a residual scaling factor allocating transmit power to PRGs to apply to all the PRGs based at least in part on the scaling factor for each PRG and allocating the transmit power to each PRG; and
means for transmitting the uplink transmission based at least in part on the scaling factor for each PRG and the residual scaling factor for the PRGs.

30. A non-transitory computer-readable medium storing code for wireless communication, the code comprising instructions executable by a processor to:
allocate a transmit power to each precoding resource group (PRG) associated with at least one of a plurality of transmit chains of a user equipment (UE) to be used to transmit an uplink transmission;
determine a scaling factor for each PRG associated with allocating transmit power to PRGs based at least in part on allocating the transmit power to each PRG;

determine a residual scaling factor allocating transmit power to PRGs to apply to all the PRGs based at least in part on the scaling factor for each PRG and allocating the transmit power to each PRG; and transmit the uplink transmission based at least in part on the scaling factor for each PRG and the residual scaling factor for the PRGs.

\* \* \* \* \*